US006704246B1

(12) United States Patent
Kervern

(10) Patent No.: US 6,704,246 B1
(45) Date of Patent: Mar. 9, 2004

(54) SOUND-RANGING SYSTEM WITH SUBMARINE BUOY

(75) Inventor: Gilles Kervern, Plouzane (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/030,193

(22) PCT Filed: Jul. 21, 2000

(86) PCT No.: PCT/FR00/02116

§ 371 (c)(1),
(2), (4) Date: May 15, 2002

(87) PCT Pub. No.: WO01/09639

PCT Pub. Date: Feb. 8, 2001

(30) Foreign Application Priority Data

Aug. 3, 1999 (FR) .......................................... 99 10083
Oct. 15, 1999 (FR) .......................................... 99 12914

(51) Int. Cl.$^7$ .......................................... G01S 15/87
(52) U.S. Cl. .......................................... 367/88
(58) Field of Search .......................................... 367/5, 88

(56) References Cited

U.S. PATENT DOCUMENTS 3,237,151 A * 2/1966 Thorpe .......................... 367/5
5,231,609 A 7/1993 Gaer .......................... 347/99
5,844,159 A 12/1998 Posseme et al. ............. 89/1.13

FOREIGN PATENT DOCUMENTS

GB 2 280 750 2/1995

* cited by examiner

*Primary Examiner*—Daniel T. Pihulic
(74) *Attorney, Agent, or Firm*—Oblon, Spivak, McClelland, Maier & Neustadt, P.C.

(57) ABSTRACT

A method for mapping a maritime zone, in which buoys transmit and receive signals that echo off a target, and are forwarded to a processing base to determine a position and estimate a velocity of a target. The method includes producing a grid for a zone of possible presence; creating blind elliptical zones by deleting direct signals between transmitting and receiving buoys; determining an amplitude and azimuth of a cell; calculating a likelihood index of a cell; calculating a neutral index of a cell; normalizing by the neutral index and performing a base adjustment; multiplying the likelihood indexes for independent observations of buoys; and thresholding of positions to obtain a number of noncontiguous contacts, forming an Active Geographic Plot.

6 Claims, 3 Drawing Sheets

SOUND-RANGING SYSTEM WITH SUBMARINE BUOY

FIELD OF THE INVENTION

The present invention is concerned with systems which allow the acoustic mapping, with the aid of a set of underwater buoys, of objects submerged within the sea. It relates more especially to the means for processing the reception signals from these buoys, which are generally transmitted by radio to a processing base usually situated in an aircraft.

DISCUSSION OF THE BACKGROUND

It is known how to map objects situated within the sea, submarines for example, by dropping acoustic buoys from an airplane. These buoys may be passive and then simply receive the acoustic signals transmitted by the targets, or active and then receive the echo of an acoustic signal which they themselves have transmitted. These acoustic signals received by the buoys often form the subject of a preprocessing making it possible for example to determine the direction of the sound signal received, and possibly its distance in the case of an active buoy, and the signal thus preprocessed is transmitted by radio to the dropping aircraft. After having utilized the signals thus transmitted individually, there has very rapidly been cause to group these processings together so as to perform a summary thereof in order to determine more accurately the characteristics of the target thus detected.

Thus, a French patent filed on Mar. 13, 1992 in the name of THOMSON-CSF under No. 92 03005 and published on Sep. 17, 1993 under No. 2 688 595 has described a processing system making it possible to perform such mapping with the aid of an array of passive buoys of the type known by the name "DIFAR".

It is also possible to use buoys comprising active sonars such as those described in American U.S. Pat. No. 3,444,508 granted on May 13, 1969 in the name of Ernest A. Granfors and Co. Each buoy is furnished with its own code which is placed in the radio signal transmitted to the dropping aircraft. They can thus be identified safely and their position can be determined by direction finding from this airplane. Since these buoys are active, they each transmit an acoustic signal coded with respect to that of the other buoys in such a way as to be able to distinguish them on reception.

Each buoy receives the signals transmitted by the other buoys. An array forming a large distributed sonar is thus obtained, operating in multistatic mode, which can be dubbed a "macro-sonar".

This multistatic nature makes it possible among other things to more accurately locate the target, to determine its velocity and to increase the probability of detection thereof as well as the extent of the zone covered by the set of buoys.

With each recurrence of transmission of the group of buoys selected to cover a specified zone, an image, or chart, of this zone is obtained. This technique is known in the art by the term AGP standing for "Active Geographic Plot". This image in fact gives a geographical representation of the position of the target, annotated with an estimate of velocity of this target.

The AGP is therefore a data processing which occurs downstream of the processing of the signal intended for extracting the basic information from the raw signals obtained from the buoys. The AGP therefore carries out a merging of the information thus obtained from this processing of the raw signals, the latter possibly arising from sensors other than those of the acoustic type, and even from sensors outside the buoys. An estimate of the various parameters of the target (position, velocity, etc.) is thus obtained, these estimates being of greater accuracy than those obtained by the other methods, by reason of an increase in the global signal/noise ratio afforded by the AGP.

The general principle of this technique of observation merging consists in performing the following operations:

segmentation of the domain of parameters to be estimated into elementary cells capable of containing the target, this corresponding to producing a grid of this domain;

for each elementary cell, calculation of the likelihood ratio relating to the set of observations made;

representation of the chart of the global likelihood of the presence of a target, and possibly thresholding of this chart if one wishes to extract a certain number of "contacts" for each chart.

In the following description, use will be made of the terms defined thus:

zone of possible presence (ZPP), the geographical zone relevant to the construction of the AGP, which is limited by the range of the buoys. This zone will be defined by a square of side x km centered approximately either on the center of gravity of the polygon defined by the buoys, or on a point designated manually by the operator.

geographical cell, the basic element of the grid of the ZPP. The dimensions of this cell, a priori square, will be similar to those of the sought-after target, i.e. for example a 50 m×50 m square.

annulus of positional resolution, the set of geographical cells (distributed according to an ellipse in the bistatic case, a circle in the monostatic case) able to contribute via their positions to the construction of the signal observed at a given instant.

zone of possible velocities (ZVP), the domain of possible velocities for the target in the plane (Vx, Vy). For a submarine this domain will for example be a square of side −25 m/s, 0, +25 m/s.

velocity ambiguity locus, the domain of possible velocity vectors for a target. This domain is such that its velocity vectors give a theoretical Doppler shift compatible with the measured Doppler shift. These velocity ambiguity loci, or iso-Dopplar loci, are straight lines.

SUMMARY OF THE INVENTION

Although the optimal technique for estimating the parameters describing the target consists conventionally in processing the position and the velocity jointly, the invention proposes that a processing allowing successive determination of the position and then the velocity be performed. Although the signal/noise ratio thus obtained is in principle worse than in the optimal method, the invention is especially well suited to the case of a multistatic array to allow the position ambiguity and velocity ambiguity to be removed. Furthermore, the invention makes it easier to carry out checks and to obtain intermediate results usable during intermediate stages of the processing.

To do this, the invention proposes a system for acoustic mapping using underwater buoys, in which there is dispersed over a maritime zone a set of active buoys which each transmit a distinct acoustic signal whose echoes on a target are received by at least two of these buoys and are forwarded by radio to a processing base which extracts basic information from these signals and compiles an AGP-type chart giving a geographical representation of the position of the target, annotated with an estimate of its velocity, characterized mainly in that in this processing, use is made of a first algorithm which comprises the following steps:

producing a grid of the zone of possible presence, the so-called ZPP, as geographical cells;

creation of blind elliptical zones by deletion of the signals corresponding to the direct paths between buoys of the acoustic waves;

determination of the observed amplitude and of the observed azimuth, of the azimuth of the relevant cell and of the deviation in azimuth between the above two;

calculation of the likelihood index of the cell;

first looping of these above two steps over all the ZPP cells;

calculation of a neutral index;

second looping of the above step over all the cells of the ZPP;

normalization by this neutral index, then base adjustment;

third looping of the above step over all the cells of the ZPP;

multiplication of the likelihood indices for the various observations;

fourth looping of the above step over all the ZPP cells;

fifth looping from the step of multiplying the indices to the stop following that of the creation of the blind elliptical zones, over the set of observations; and thresholding of the positions thus obtained so as to obtain a number N of noncontiguous contacts, forming the AGP chart of the positions; N being fixed by the processing capabilities of the algorithms for utilization according to same.

According to another characteristic, use is made of a second algorithm which follows the first and which comprises the following steps:

determination of the velocities with respect to each buoy from the successive determinations over time of the positions of targets;

producing a grid of the zone of possible velocities as so-called ZVP velocity cells;

calculation of a likelihood index for the velocities;

multiplication of the likelihood indices for the various observations;

first looping of these above two steps over the set of observations;

second looping of these above three steps over all the cells of the ZVP; and thresholding of the velocities thus obtained and extraction of the maximum so as to determine the most likely velocities, which form the ZVP chart of velocities.

According to another characteristic, the first algorithm is performed over a set of Doppler channels so as to obtain N images $AGP_{dop}$, and in that use is made of a third algorithm which follows the first and which comprises the following steps:

producing a grid of the zone of possible velocities as so-called ZVP velocity cells;

determination of the theoretical velocity associated with the relevant cell;

determination of a velocity likelihood index for each Doppler channel and for each buoy;

summation of these likelihood indices;

first looping of these above two steps over the various relevant Doppler channels;

second looping of these above two steps over the various pairs of buoys;

third looping of these above three steps over all the cells of the ZVP; and thresholding of the velocities thus obtained and extraction of the maximum so as to determine the most likely velocities, which form the ZVP chart of velocities.

BRIEF DESCRIPTION OF THE DRAWINGS

Other features and advantages of the invention will become clearly apparent in the following description, presented by way of nonlimiting example with regard to the appended figures which represent.

DETAILED DESCRIPTION OF THE PREFERRED EMBODIMENTS

Figure 1:
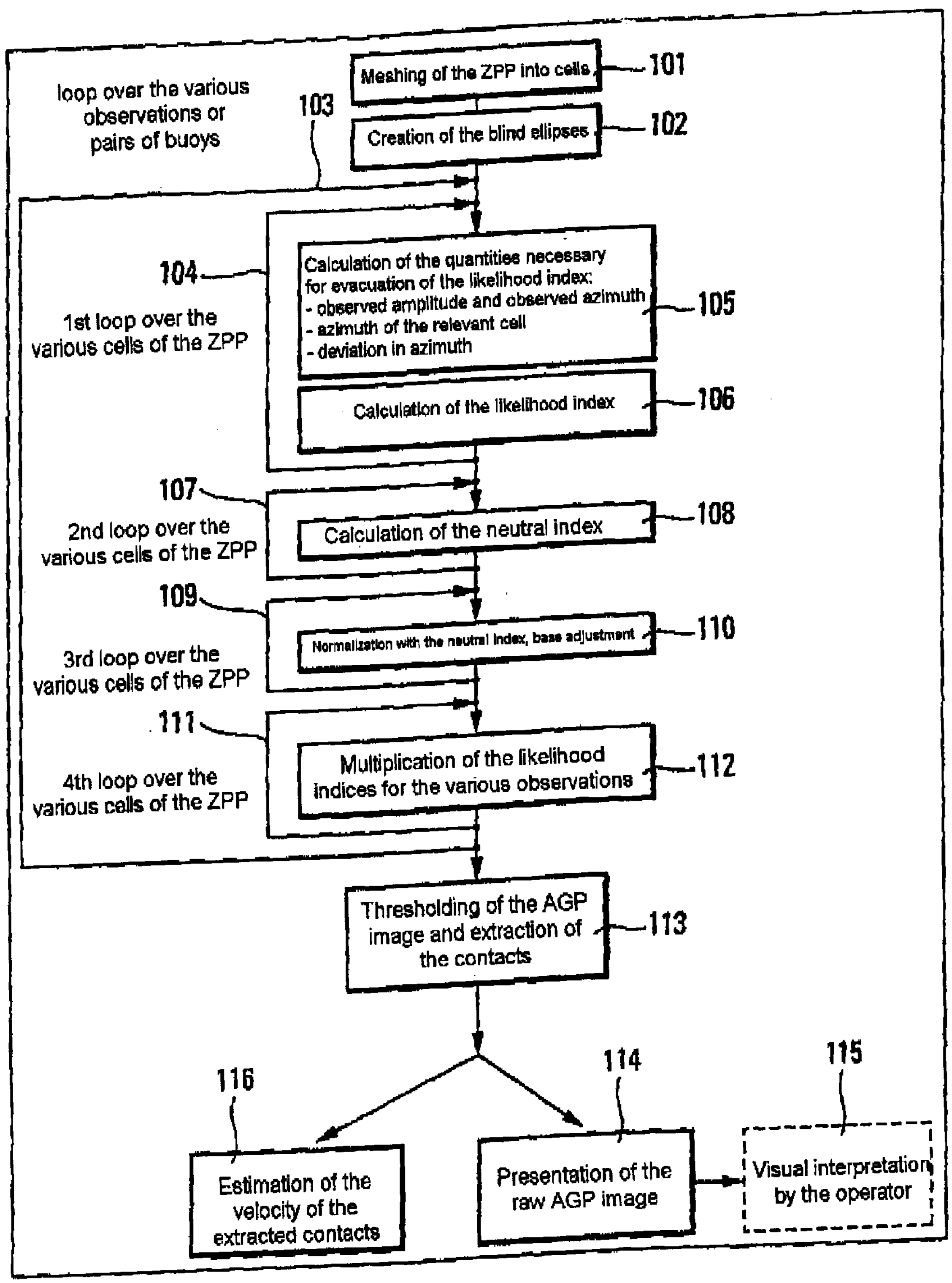
FIG. 1, a flowchart of the processing making it possible to obtain the AGP chart of the positions of the target.

The invention proposes that a first algorithm, termed A1, for estimating the position of the target, and a second algorithm, termed A2' or A2", for estimating the velocity of the target in a specified position, be used in succession.

When for active buoys, use is made of the so-called FM mode for detection, which consists in using broadband pulses, where it is not possible to measure the Doppler effect, the invention will reduce to algorithm A1. When for active buoys, use is made of the so-called FF/CW mode for detection, corresponding to a transmission of pure frequency, the processing is composed of the algorithm A1 followed by one of the two algorithms A2' or A2".

The AGP processing can be triggered either by a manual mode on the request of the operator, or by an automatic mode.

The precise characteristics of these two modes, such as the choice of transmitting buoys, the transmission rate, the geometry of the buoys, etc. have no influence on the AGP merging schemes and will therefore not be described precisely in the subsequent text.

The results of the processing make it possible to obtain a current AGP image. By performing an integration of several successive current AGP images, for example 5 to 10 images, it is then possible to obtain a "summary" image which is more readable since it highlights the trajectories of interesting targets.

The signals forming the subject of the processing by AGP are, more especially in the FM mode where one seeks to accurately determine the position, the following:

$s^2(t)=a(t)$ which is the averaged modulus squared of the demodulated complex signal received omnidirectionally on the buoy by the omnidirectional sensor carried by said buoys;

$\phi(t)$ which is the averaged apparent azimuth of the sound field received by the buoy. It is known that in the presence of a single target and when the signal-to-noise ratio is high, this azimuth corresponds to the direction of the target.

In addition to these signals, the processing uses a certain number of data items, in particular the positioning coordinates of the buoys, which determine the horizontal distances between them, the height of water over the relevant zone and the submersion of the buoys.

The processing in FP or CW mode, which makes it possible to determine the velocity accurately, uses these same signals and the following signals:

- $s^2(v,t)=a(v,t)$ collected into a table which for the various channels of the Doppler analysis gives the temporal profile of the averaged modulus squared of the demodulated complex signal. These signals are received omnidirectionally on the omnidirectional sensor of the buoy.
- $\phi(v,t)$ collected into a table which for the various Doppler analysis channels gives the temporal profile of the averaged apparent azimuth of the sound field received on the buoy. For a single target and a high signal-to-noise ratio and considering a specified Doppler channel, this signal corresponds to the azimuth of the target.

The algorithm A1 making it possible to obtain the AGP of the positions uses, for each receiving buoy, the signals a(t) and $\phi(t)$ which have been normalized.

These signals are obtained:

- on output from the FM processing, this making it possible to obtain an AGP image of the positions in FM mode;
- on output from each Doppler channel in CW processing, by fixing v in a (v,t) and $\phi(v,t)$, thereby making it possible to obtain an AGP image of the positions for the relevant Doppler channel v;
- on output from the CW processing if the summarized signals $a(t)=max\_in\_v[a(v,t)]$, $\phi(t)=\phi(Arg\_in\_v\_du\_max\ [a(v,t)],\ t)$, thereby making it possible to obtain an AGP image of the positions for the set of Doppler channels.

The flowchart of the processing A1 is represented in FIG. 1. Firstly, at 101, the ZPP is grided into geographical cells of dimensions adapted to the resolution of the observations and to the dimension of the target (typically 50 m by 50 m). The likelihood of each cell is then set to zero.

At 102, temporal portions corresponding to the "transmitting buoy-receiving buoy" direct path are deleted from the signals from the buoys working in bistatic mode, this giving rise to the creation of elliptical so-called blind zones surrounding each transmitter/receiver pair.

For each of the observations (that is to say each pair of buoys), the following loop 103 is performed, this comprising four internal loops;

For each cell, a first loop 104 over the cells of the ZPP, which makes it possible to obtain a raw index;

- the measurement (amplitude, azimuth) relating to the relevant geometrical cell is determined at 105 by performing a determination of the observation of amplitude relating to the cell, either by "peak-picking" if there are several observations per cell, or by interpolation at the center of the cell if there are fewer than two observations per cell, then a determination of the azimuth observation associated with the amplitude adopted, and a determination of the accuracy of angular location which depends on the observed amplitude of the echo.

This accuracy is given by:

$$\sigma_{\Delta\varphi} = \sqrt{\frac{1}{rsb.N} + \sigma_{compas}^2} \simeq \sqrt{\frac{1}{(a-1)N} + \sigma_{compas}^2} \quad (1)$$

where

- a is the observed averaged amplitude
- N is the number of independent averaged elementary samples,
- $\sigma_{compass}$ is the standard deviation of the heading reference provided by the compass of the buoy (of the order of a few degrees),
- rsb: signal-to-noise ratio, rsb≅a−1 for a normalization as a'/m where m is the local average of the nonnormalized omnidirectional signal a',a=Max (l,a),
- at 105 the deviation in azimuth, $\Delta\phi=\phi_0-\phi(t)$ between the azimuth $\phi_0$ of the relevant cell seen from the receiving buoy and the measured azimuth $\phi(t)$ of the target, is also determined.

Next, at 106 the likelihood index of the cell is calculated according to the expression:

$$I=\text{Gauss}(m_{\Delta\phi}=0,\ \sigma_{\Delta\phi}) \text{ with } \sigma_{\Delta\phi}=\max(\pi,\sigma_{\Delta\phi}) \quad (3)$$

in which $m_{\Delta\phi}=0$ expresses the fact that the average is zero.

A second loop 107 over the set of cells of the ZPP makes it possible to calculate at 108 the neutral index according to the expressions:

$$I_{neutral}=\text{average\_of\_I}+1.5.\text{standard deviation\_of\_}I \quad (4)$$

($k_1$=1.5 is a parameter adjustable between 0.5 and 3)

A third loop 109 over the set of cells of the ZPP makes it possible to normalize at 110 by the neutral index, with assignment of the neutral index to the cells not addressed by the signal, and finally to perform a base adjustment according to the formula:

$$\text{Minimum\_index}=\text{Maximum\_index}/100=1(\sigma_{compass}\sqrt{2}\pi)/(I_{neutral}\cdot 100) \quad (5)$$

($k_2$=100 is a parameter adjustable at 100 and 300)

A fourth loop 111 over the set of cells of the ZPP makes it possible to multiply at 112 (for one and the same cell), the various assumed likelihood indices associated with independent observations of various buoys, this being so as to construct the geographical chart of the AGP likelihood of the positions.

Next, at 113 a thresholding of the AGP chart of the positions is performed, retaining only the N index cells of maximum likelihood, N being fixed by the processing capabilities of the algorithms situated downstream of this algorithm A1 (formation of the AGP charts of the velocities, tracking, etc.). If several cells are contiguous, they are merged, retaining only the cell of maximum likelihood. In order for the number of contacts extracted by carrying out AGP to be kept constant and after possible merging of certain contacts, supplementary contacts of lower levels are extracted and are merged if there is again contiguity, and so on and so forth until N noncontiguous contacts have been extracted.

The output from the algorithm is performed at 114 through a presentation of the raw AGP image, which can be interpreted visually at 115 by an operator, or at 116 through an estimate of the velocity of the extracted contacts, preferably with one of the algorithms A2.

The AGP algorithm A2 which makes it possible to estimate the velocities and which can take the two forms A2' and A2", is applied in CW mode and aims to give an estimate of the velocity vector of the target. It assumes that an AGP image of the positions has been obtained previously. It is applied in respect of a possible position of the target and hence in particular in respect of the N positions extracted by the algorithm A1 for forming the AGP image of the positions.

For one of these positions, a ZVP of the velocities (typically a zone such that $V_x=\pm25$ m/s and $V_y=\pm25$ m/s) is considered, according to a similar principle to that of the AGP of the positions. A likelihood index for the velocity in each cell of the ZVP is calculated for each buoy. The set of cells with high index then depicts the velocity ambiguity locus(iso-Doppler straight line) for the relevant buoy. Next, the indices associated with each of the observations are accumulated and the velocity of the target is then defined as being that of the call of maximum index. As a general rule, this cell is also the point of intersection of the various velocity ambiguity loci.

The invention proposes two variants A2' and A2" of this algorithm, which differ according to the way of merging the information emanating from the various Doppler channels of the CW processing.

The algorithm A2' is the simpler and faster of the two algorithms of type A2. It uses a "summary" of the signals emanating from the CW processing. The summarized signals consist of three curves, time dependent, formed from the Doppler/distance, azimuth and amplitude images, according to the procedure corresponding to the formulae:

$$a(t)=\text{Max\_in\_v}[a(v,t)] \tag{6}$$

$$v(t)=\text{Arg\_in\_v\_of\_max}[a(v,t)] \tag{7}$$

$$\phi(t)=\phi(\text{Arg\_in\_v\_of\_max}[a(v,t)],t) \tag{8}$$

v(t) is the deviation in Doppler frequency between the carrier frequency transmitted and the frequency received by the buoy.

In order to achieve greater accuracy in the determination of Max_in_v[a(v,t)], it will also be possible to interpolate parabolically between the values sampled at the stepsize $\Delta v=1/T$ of a (v,t) (T length of the CW pulse used).

The signals a(t) and $\phi(t)$ are used initially to form an AGP image of the positions according to algorithm A1. For the N contacts extracted from this AGP image, N AGP images of the velocities are then formed.

Figure 2:
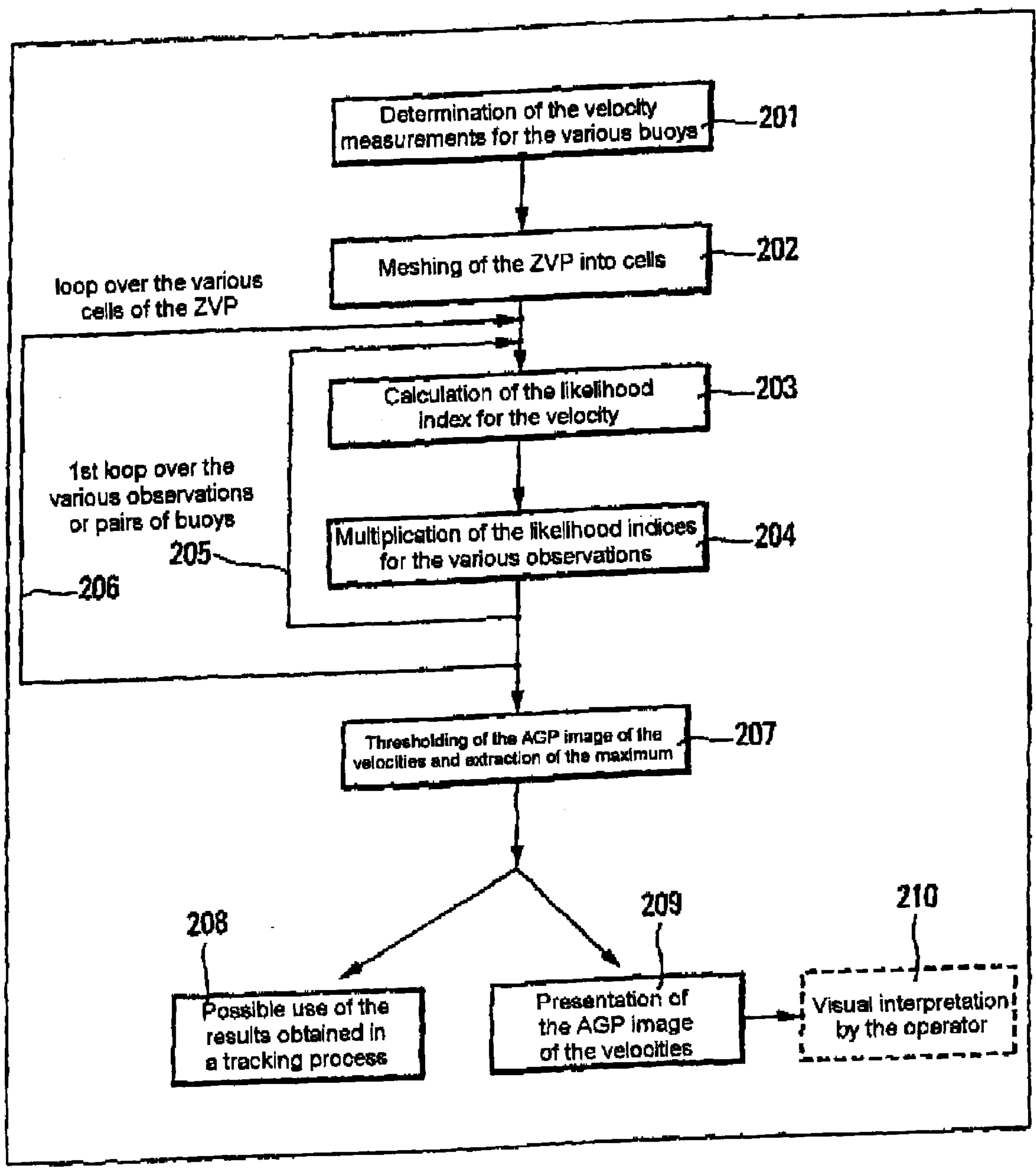
FIG. 2, a flowchart of a first variant of the processing making it possible to obtain the AGP image of the velocities of the target.

The flowchart of algorithm A2' is represented in FIG. 2.

The relevant contact yields through its position the arrival times $\{t_1, \ldots, t_i, \ldots t_k\}$ associated with the k buoys of the array, this making it possible to calculate at 201 k estimates of the algebraic sum of the projections of the velocity vector along the "transmitting buoy/target" axis $V_e$ and "target/receiving buoy" axis $v_r$, the algebraic sum of the velocities deduced from the $v_i$ $(t_i)$:

$$\{(v_e+v_r)_1=c\cdot v_1(t_1)/v_0, \ldots, (v_e+v_r)_i=c\cdot v_i(t_i)/v_0, \ldots, (v_e+v_r)_k=c\cdot v_k(t_k)/v_0\}$$

where $V_0$ is the carrier frequency transmitted by the transmitting buoy.

The grid of the ZVP is produced at 202.

To determine the velocity of the target, a calculation of a likelihood index is performed on each of these projections of the velocity vector.

To do this, it is assumed that the probability density of the measurement $(v_e+v_r)_i$ is of the Gausssian law type;

$$p_v(v_e+v_r)=\frac{1}{\sigma_v\cdot\sqrt{2\pi}}\cdot e^{\frac{(v_e+v_r-v_{cell})^2}{2\cdot\sigma_v^2}} \tag{9}$$

where $v_{cell}$ is the algebraic sum of the velocities which should be measured on the relevant buoy if the target were to have the velocity vector associated with the relevant cell of the ZVP, the standard deviation of the estimate of the velocity is assumed to follow a Woodward type law:

$$\sigma_v=\text{Min}\left(\frac{c\cdot\sqrt{3}}{v_0\cdot 2\pi\cdot T\cdot\sqrt{rsb}}\cdot V_{\max}\right) \tag{10}$$

with:

T duration of the pulse transmitted in CW mode, rsb the signal-to-noise ratio which will be estimated by rsb=(a−1) with a=Max(1,a), $v_{max}$ the semi-amplitude of the velocity domain explored.

A velocity likelihood index is then calculated at 203, given by;

$$I=p_v((v_e+v_r)_i) \tag{11}$$

A multiplication (or an addition of the logarithms) of the likelihood indices is then performed at 203 so as to average over the various observations of the buoys, by performing a first loop 205.

$$I=\sum_{i=1}^{\text{k\_buoy}}\log(p_v[(v_e+v_r)_i]) \tag{12}$$

A second loop 206 is performed afterward over the various cells of the ZVP.

The AGP image thus obtained is threshold at 207 so as to extract the maximum which determines the most likely velocity vector for the relevant contact.

The output of the algorithm is performed at 209 by a presentation of the AGP image of the velocities, which can usually be interpreted at 210 by an operator, or at 208 so as to feed a possible tracking process.

The algorithm A2" is the more effective but also the more complex of the two algorithrms of type A2. It uses the set of signals emanating from the CW processing. It assumes that the algorithm A1 has been applied to the set of Doppler channels and then that the results emanating from the AGPs of the positions in each Doppler channel have been merged so as to form a global chart of the positions from which are extracted possible contacts or positions of the target, for each of which an AGP image of the velocities is then formed.

The CW/Doppler processing of the active buoy can be regarded as a sliding spectral analysis over time. The signals output by the CW signal processing consist for each of the Doppler channels of an estimate of the instantaneous power received and an estimate of the azimuth of the incident instantaneous signal;

$$\text{signals obtained for buoy b and Doppler channel } f_1\{a(t),\phi(t)\}_{buoy\ b,\ channel\ f} \tag{13}$$

The algorithm for merging between several Doppler channels relies on the finding that the purpose of the spectral analysis according to various Doppler channels is to increase the signal-to-noise ratio in the channel containing the target. Algorithm A2" therefore begins with a merge between buoys in one and the same channel (algorithm A1) then performs a detection in the $AGP_f$ chart obtained for the relevant Doppler channel, and finally performs the merging of the detection results for the various Doppler channels.

Figure 3:
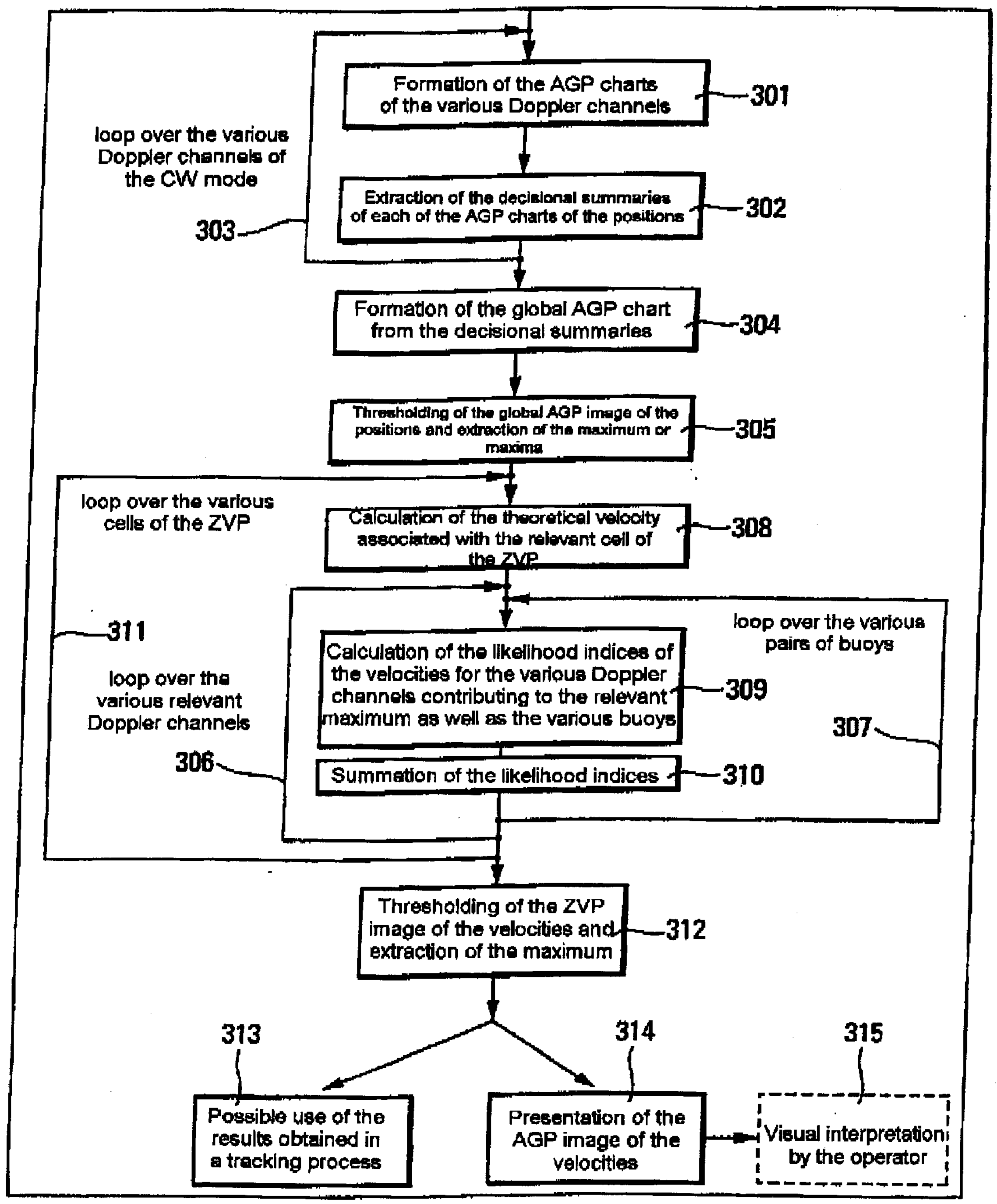
FIG. 3, a flowchart of a second variant of this processing.

The algorithm A2" runs in three steps which are represented in FIG. 3.

A first step consists in forming the AGP charts of each Doppler channel and in extracting the decisional summaries.

For one and the same Doppler channel and the set of buoys, the AGP image associated with this channel is formed at 301 according to the method described in the FM/pulsed case (algorithm A1). In these AGP images specific to each Doppler channel the geographical cells may be large since the resolution of the pulse is low. A typical value is 100 m.

The $AGP_f$ image, in the relevant Doppler channel, having been obtained, a "decisional summary" of this image is formed at 302. It is this decisional summary which will form the subject of the merge between the set of observed Doppler channels. This decisional summary must consist of the following data as a minimum:

- the mean level of the $AGP_f$ image,
- the standard deviation of the $AGP_f$ image,
- the level of the maximum of the $AGP_f$ image,
- the x,y position of the maximum of the $AGP_f$ image,
- the following parameters: minor axis, major axis, direction of the major axis of the ellipse of inertia of the domain surrounding the maximum and of level greater than or equal to a threshold value,
- the relative contributions $\{\ldots, a_i \ldots\}$ of each of the buoys to the maximum of the $AGP_f$ image.

The effect of the decisional summary is to reduce the $AGP_f$ image to an elliptical domain, to which domain is attached a presence of target index.

The threshold value used for the definition of the domain of the maximum, is given by the following procedure:

rsb_of_max=(level_of_max−level_mean)/standard_deviation_of_level val_threshold=(level_of_max level_mean)·(1k$_3$/rsb_of_max$^2$)+level_mean k$_3$=2

This procedure makes the assumption that the signal-to-noise ratio of the maximum is measurable from the image and that the peak of the maximum follows a parabolic shape, the determination of whose position obeys a Woodward type law. The parameter $k_3$ can possibly be adjusted by varying it within the interval [0.5;4].

This procedure is performed for all the Doppler channels with the aid of a loop 303.

In a second step, the AGP charts of the various Doppler channels are merged.

This merge is performed using the set of "decisional summaries" by summation at 304 of the charts reduced to an elliptical domain. The result of this summation culminates in a global $AGP_{gp}$ chart of the positions. The position of the first N (N=4 for example) noncorrelated maxima are determined on this $AGP_{gp}$ chart by thresholding and extraction of the maximum or maxima at 305. It is for these first N noncorrelated maxima that the merging of the Doppler information will be performed so as to determine the direction and the modulus of the velocity vector of the target. This last merge will then culminate in N images $AGP_{dop}$.

In a third step, the AGP charts or images of the velocities are formed.

These $AGP_{dop}$ charts of the velocities are formed only for the N maxima retained in the $AGP_{gp}$ chart of the positions. The method of forming an $AGP_{dop}$ chart is as follows:

- determination in the file of the decisional summaries of the $AGP_f$ which have participated in the value of the relevant maximum, of the following quantities:
  - the relative contributions of the various Doppler channels which gave the maximum:

$c_f$, $0<c_f\leq 1$, $cf_0$=

$$Cf_0 = \frac{RSBf_0}{\sum_f RSBf}$$

- where f describes the set of Doppler channels contributing to the relevant maximum.
  - in each channel the relative participation of each buoy;

$C_b$, $0\leq C_b\leq 1$, $$C_{b0} = \frac{I_{b0}}{\sum_b I_b}$$

where b describes the set of buoys of the array and where $I_{b0}$ is the likelihood index, within the meaning of algorithm $A_1$, of the relevant maximum,

- producing a grid of the AGP chart of the velocities (for example: ±25 m/s, width of the cells 0.25 m/s)
- for each cell of the AGP chart of the velocities:
  - for each of the Doppler channels (previously identified) which contribute via a loop 306 and for each of the buoys which contribute, via a loop 307:
    - calculation at 308 of the algebraic sum of the projections of the velocity vector of the cell along the "transmitting buoys/target" and "target/receiving buoy" axes;
    - calculation at 309 of a Doppler likelihood index dependent on the deviation between the sum of the projected velocities and the velocity associated with the relevant Doppler channel, This index will be of the form:

$$I=C_f C_b.F[(v_e+v_r)\text{ theoretical of the cell}-(v_e+v_r)\text{channel}-f] \quad (16)$$

With $(v_s+v_r)$ channel $-f=cf/f_0$, where $f_0$ is the carrier frequency transmitted by the transmitting buoy.

Where F is the function describing the Doppler analysis window of the CW processing implemented. A coarse estimate of this window is a rectangle whose width is that of the Doppler spectral channel.

$C_f.C_b$ represents an estimate of the spectral component, at the frequency f, of the Doppler spectrum of the target, seen from buoy b.

This process highlights on the AGP image of the velocities a straight band corresponding to the locus of Doppler ambiguity of the measurement given by the relevant buoy and for the relevant Doppler channel.

- summation at 310 of the likelihood indices associated with each channel and with each buoy. These operations are repeated over all the cells of the ZVP by a loop 311. This then culminates in an intersection of bands of variable amplitudes. If a target is associated with the relevant maximum of the $AGP_{gp}$ image of the positions, these bands cut one another in the vicinity of one and the same point, thus defining the velocity vector of the target.

There are then the thresholding operation 312 and the use of results operations 313 to 315 identical to those 207 to 210 of FIG. 2.

By way of variant embodiment, the invention proposes that several AGP images of the positions be integrated so as to allow visual tracking of the target.

An example of an algorithm usable for this purpose is as follows:

in a first step, the current AGP image is thresheld;

the threshold of the first image being defined by the operator, for the subsequent images we work with a number of contacts constant through adaptive thresholding, the latter fluctuating as a function of the number of contacts retained on the previous image according to the formula:

$$S_{i+1} = S_i + \frac{1}{\tau}\left(\frac{Nd_i}{Nc} - \frac{Nc}{Nd_i}\right) \quad (17)$$

where $\tau$ is a time constant to be adjusted

Nc is the desired number of contacts per image

Nd the number of contacts obtained/detected in image i in a second step, the contacts extracted on the previous successive AGP images are integrated over one and the same image.

What is claimed is:

1. A method for acoustic mapping using buoys dispersed throughout a maritime zone, the buoys including active buoys for transmitting distinct signals that echo off a target and are received by at least two of the buoys, the distinct signals being forwarded to a processing base to extract signal information, the processing base compiling an Active Geographic Plot (AGP) providing a geographical representation of a position of the target and an estimate of a velocity of the target, the method providing for a successive determination of the position and the estimate of the velocity and comprising the steps of:

(a) producing a grid of cells for a zone of possible presence (ZPP);

(b) creating blind elliptical zones by deleting signals corresponding to direct paths between transmitting and receiving buoys;

(c) determining an amplitude and azimuth of a cell;

(d) calculating a likelihood index of the cell;

(e) first looping of steps (c) and (d) over all cells of the ZPP;

(f) calculating a neutral index of a cell;

(g) second looping of step (f) over all cells of the ZPP;

(h) normalizing by the neutral index and then performing a base adjustment;

(i) third looping of step (h) over all cells of the ZPP;

(j) multiplying the likelihood indexes associated with independent observations of various buoys;

(k) fourth looping of step (j) over all cells of the ZPP;

(l) fifth looping of steps (c)–(j) over the independent observations; and (m) thresholding of the positions to obtain a number of noncontiguous contacts forming an AGP chart of the positions.

2. The method as claimed in claim 1, wherein the method further comprises the steps of:

(a1) determining the velocities of the target with respect to each of the buoys from successive determinations of the position of the target over time;

(b1) producing a grid of cells for a zone of possible velocities (ZVP);

(c1) calculating a likelihood index for the velocities;

(d1) multiplying the likelihood indexes associated with independent observations of the buoys;

(e1) first looping of steps (c1) and (d1) over the independent observations;

(f1) second looping of steps (c1)–(e1) over all cells of the ZVP; and (g1) thresholding of the velocities and extracting a maximum to determine most likely velocities, which form a ZVP chart of velocities.

3. The method as claimed in claim 1, wherein steps (a)–(m) are performed over a set of Doppler channels to obtain $AGP_{dop}$ images, the method further comprising the steps of:

(a2) producing a grid of cells for a zone of possible velocities (ZVP);

(b2) determining a theoretical velocity for a cell of the ZVP;

(c2) determining a velocity likelihood index for each Doppler channel and for each of the buoys;

(d2) summing the velocity likelihood indexes;

(e2) first looping of steps (c2) and (d2) over relevant Doppler channels;

(f2) second looping of steps (d2) and (e2) over pairs of the buoys;

(g2) third looping of steps (d2)–(f2) over all cells of the ZVP;

(h2) thresholding of the velocities and extracting a maximum to determine most likely velocities, which form a ZVP chart of velocities.

4. A computer program product for compiling an Active Geographic Plot (AGP) giving a geographical representation of a position and an estimate of a velocity for an underwater target, wherein the computer program utilizes data pertaining to distinct acoustic signals echoed off of the underwater target and received by at least two buoys, the computer program product comprising:

(a) a first computer code configured to produce a grid of cells for a zone of possible presence (ZPP);

(b) a second computer code configured to create blind elliptical zones by deleting signals corresponding to direct paths between transmitting and receiving buoys;

(c) a third computer code configured to determine an amplitude and azimuth of a cell;

(d) a fourth computer code configured to calculate a likelihood index of the cell;

(e) a fifth computer code configured to execute a first looping of steps (c) and (d) over all cells of the ZPP;

(f) a sixth computer code configured to calculate a neutral index of a cell;

(g) a seventh computer code configured to execute a second looping of step (f) over all cells of the ZPP;

(h) an eighth computer code configured to normalize by the neutral index and then perform a base adjustment;

(i) a ninth computer code configured to execute a third looping of step (h) over all cells of the ZPP;

(j) a tenth computer code configured to multiply the likelihood indexes associated with independent observations of various buoys;

(k) an eleventh computer code configured to execute a fourth looping of step (j) over all cells of the ZPP;

(l) a twelfth computer code configured to execute a fifth looping of steps (c)–(j) over the independent observations; and (m) a thirteenth computer code configured to threshold the positions to obtain a number of noncontiguous contacts, forming an AGP chart of the positions.

5. The computer program as claimed in claim 4, further comprising:

(a1) a first computer code configured to determine the velocities of the target with respect to each of the buoys from successive determinations of the position of the target over time;

(b1) a second computer code configured to produce a grid of cells for a zone of possible velocities (ZVP);

(c1) a third computer code configured to calculate likelihood index for the velocities;

(d1) a fourth computer code configured to multiply the likelihood indexes associated with independent observations of the buoys;

(e1) a fifth computer code configured to execute a first looping of steps (c1) and (d1) over the independent observations;

(f1) a sixth computer code configured to execute a second looping of steps (c1)–(e1) over all cells of the ZVP; and (g1) a seventh computer code configured to threshold the velocities and extract a maximum to determine most likely velocities, which form a ZVP chart of velocities.

6. The computer program product as claimed in claim 4, further comprising:

(a2) a first computer code configured to produce a grid of cells for a zone of possible velocities (ZVP);

(b2) a second computer code configured to determine a theoretical velocity for a cell of the ZVP;

(c2) a third computer code configured to determine a velocity likelihood index for each Doppler channel and for each of the buoys;

(d2) a fourth computer code configured to sum the velocity likelihood indexes;

(e2) a fifth computer code configured to execute a first looping of steps (c2) and (d2) over relevant Doppler channels;

(f2) a sixth computer code configured to execute a second looping of steps (d2) and (e2) over pairs of the buoys;

(g2) a seventh computer code configured to execute a third looping of steps (d2)–(f2) over all cells of the ZVP;

(h2) an eighth computer code configured to threshold the velocities and extract a maximum to determine most likely velocities, which form a ZVP chart of velocities.

* * * * *